United States Patent [19]
Hodges

[11] Patent Number: 5,297,817
[45] Date of Patent: Mar. 29, 1994

[54] STREET COMPRESSION CLOSET FLANGE

[75] Inventor: B. Eugene Hodges, Greenville, Mich.

[73] Assignee: James Bruno, Ada, Mich.

[21] Appl. No.: 985,598

[22] Filed: Dec. 3, 1992

[51] Int. Cl.[5] ............................ F04B 5/48; F16L 23/09
[52] U.S. Cl. ......................................... 285/15; 285/42; 285/56; 285/2
[58] Field of Search ..................... 285/15, 42, 56, 60, 285/109, 346, 336; 52/20; 210/166

[56]     References Cited
U.S. PATENT DOCUMENTS

| | | | |
|---|---|---|---|
| 569,247 | 10/1896 | Smith | 285/346 |
| 3,579,670 | 5/1971 | Frank | 285/56 |
| 3,911,635 | 10/1975 | Traupe | 52/20 |
| 4,505,499 | 3/1985 | Uglow et al. | 285/346 |
| 4,574,402 | 3/1986 | Brown, Sr. | 285/56 |
| 4,799,713 | 1/1989 | Uglow | 285/42 |
| 4,850,617 | 7/1989 | Moberly | 285/42 |
| 4,984,308 | 1/1991 | Handal | 285/56 |
| 5,054,956 | 10/1991 | Huang | 52/20 |
| 5,141,633 | 8/1992 | Walczak et al. | 285/346 |
| 5,190,320 | 3/1993 | Hodges | 285/56 |

Primary Examiner—Eric K. Nicholson
Attorney, Agent, or Firm—Bullwinkel Partners, Ltd.

[57]     ABSTRACT

A street compression closet flange for replacing broken cast iron closet flanges in old buildings comprises an upper cylindrical section, a lower cylindrical section, a rubber seal, and three sets of nuts and bolts. After the broken closet flange has been removed, the street flange is inserted inside the existing pipe. A compression seal if formed between the street flange and the inside of the pipe by tightening the nuts and bolts. The street flange may be slid up or down to achieve the desired height. The street flange may also be used in new building construction instead of conventional closet flanges.

5 Claims, 4 Drawing Sheets

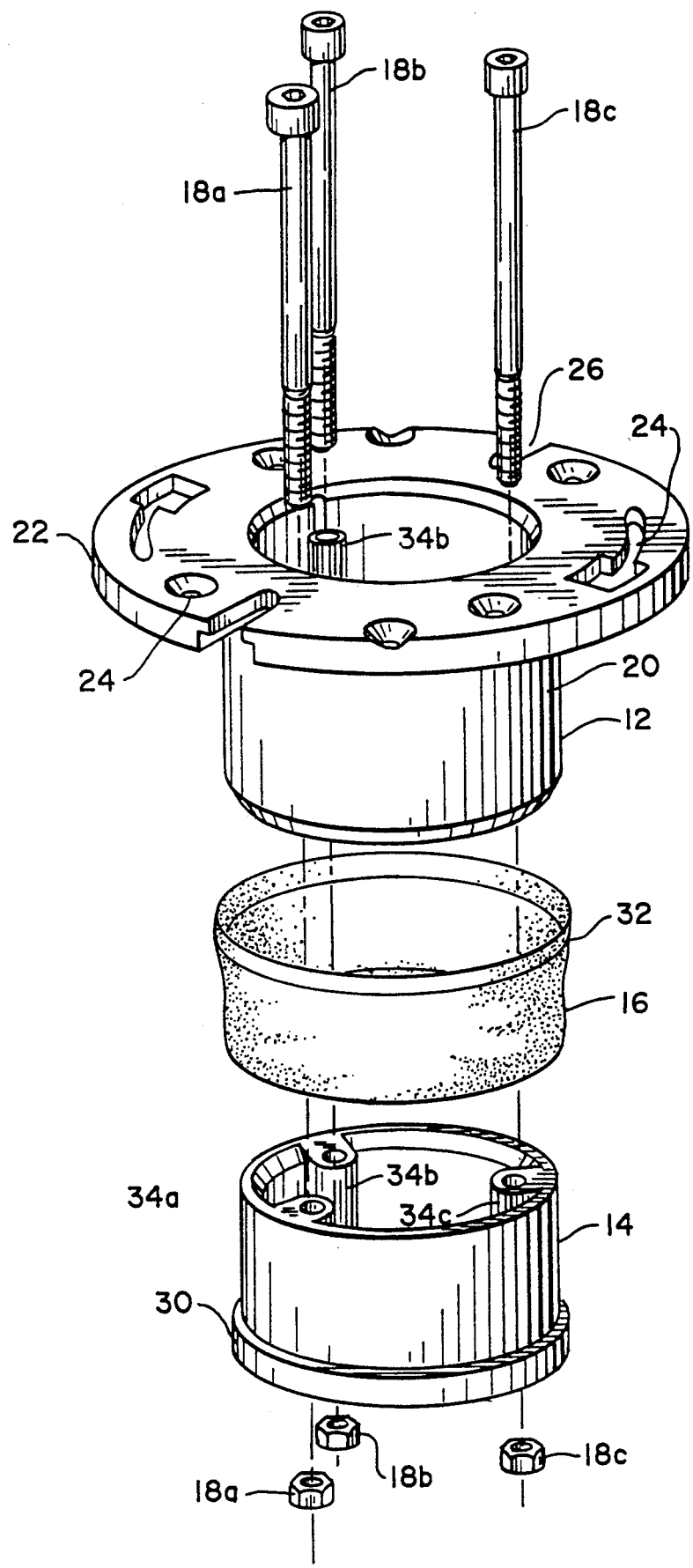

STREET COMPRESSION CLOSET FLANGE

BACKGROUND

1. Field Of The Invention

This patent relates to the plumbing trade. More particularly, this patent relates to a street compression closet flange which can be used in old buildings to replace broken cast iron closet flanges. The present invention can also be used in new building construction instead of conventional cast iron closet flanges.

2. Description Of The Related Art

Drain pipes in older houses typically consist of 4-inch cast iron pipes with leaded joints. In the case of two-story houses, these pipes typically run inside the floor joist area between the plaster ceiling and the wood floor above.

The joints typically are sealed using the lead and oakum method. This method entails 1) beating down oakum fiber with a chisel or other implement to seal the joint between the pipe flange and the closet flange, 2) pouring hot lead into the joint, and 3) beating down the cooled lead.

If the closet flange breaks it must be replaced. This is ordinarily done by breaking the pipe off at the joint between the pipe and the flange and replacing the flange. Once the pipe is broken off at the joint, the closet flange is cut off with a carbide-tipped tool. The old lead is cleaned out and a new flange is installed.

One problem with replacing old closet flanges is that it is difficult to reach the joint. The flange is often located below the wood flooring used in many older houses. The small hole in the floor makes it difficult to reach the flange. Consequently, it is often necessary to tear up the floor to get to the lead joint.

Another problem with the conventional method of replacing cast iron closet flanges is that the cost of replacement, including the cost of cleaning out the lead joint, can be prohibitive. Furthermore, repouring hot lead into the new seal between the cast iron flange and the pipe involves the risk of pouring the hot lead onto the surrounding floor resulting in damage to the floor, whether it be tile, ceramic, or other material.

A different sort of problem exists when installing a closet flange on top of a drain pipe in a new building having a concrete floor. In new buildings, the drain pipes are typically installed first and the concrete floor poured later. The drain pipe usually extends above the surface of the concrete floor. In order to install a conventional closet flange, it is necessary to chip away the concrete from around the pipe in order to make room for the flange. This method of installing flanges is difficult, time consuming and expensive.

It is therefore a principal object of the present invention to provide an improved method and apparatus for replacing broken cast iron closet flanges in existing buildings.

A further object is to provide a cast iron closet flange replacement with telescoping ability to make it easier to repair a broken flange which is located below floor level.

A still further object is to provide a cast iron closet flange replacement which does not require removal of the old leaded joint and pouring of a new leaded joint.

Another object is to provide a cast iron closet flange replacement which can be used with 4" schedule 40 P.V.C. or A.B.S. pipe as well as cast iron pipe.

Yet another object of the present invention is to provide a street compression closet flange which can be used in new construction to eliminate the need to chisel away the concrete from around the drain pipe before installing the flange.

SUMMARY OF THE INVENTION

The present invention is a four inch street compression closet flange that can be used in existing buildings to replace broken cast iron closet flanges or in new building construction instead of conventional closet flanges. The street compression closet flange comprises an upper section, a lower section, a seal, and fastening means. The upper section has a cylindrical body and a shoulder extending radially outward from one end of the body at a right angle. The shoulder has a plurality of openings for receiving attachment means. The lower section has a cylindrical body with a lip at one end for seating a substantially cylindrical seal. The lip has an outside diameter substantially the same as the outside diameter of the upper section body.

The upper and lower sections have integrally formed channels located on the inside walls of the upper and lower section bodies for receiving fastening means. The channels are recessed away from the shoulder of the upper section.

The substantially cylindrical seal has an outside diameter slightly greater than the outside diameter of the upper section body and the lower section lip, and has a slight outward flair at one end to accommodate a portion of the upper section body.

Tightening the fastening means which are threaded through the channels draws the upper section body inside the seal and forces the seal outward, thus forming a compression fit between the seal and the inside of the drain pipe.

THE DRAWINGS

FIG. 6 is an exploded view of the flange of FIG. 1.

DETAILED DESCRIPTION OF THE INVENTION

Figure 1:
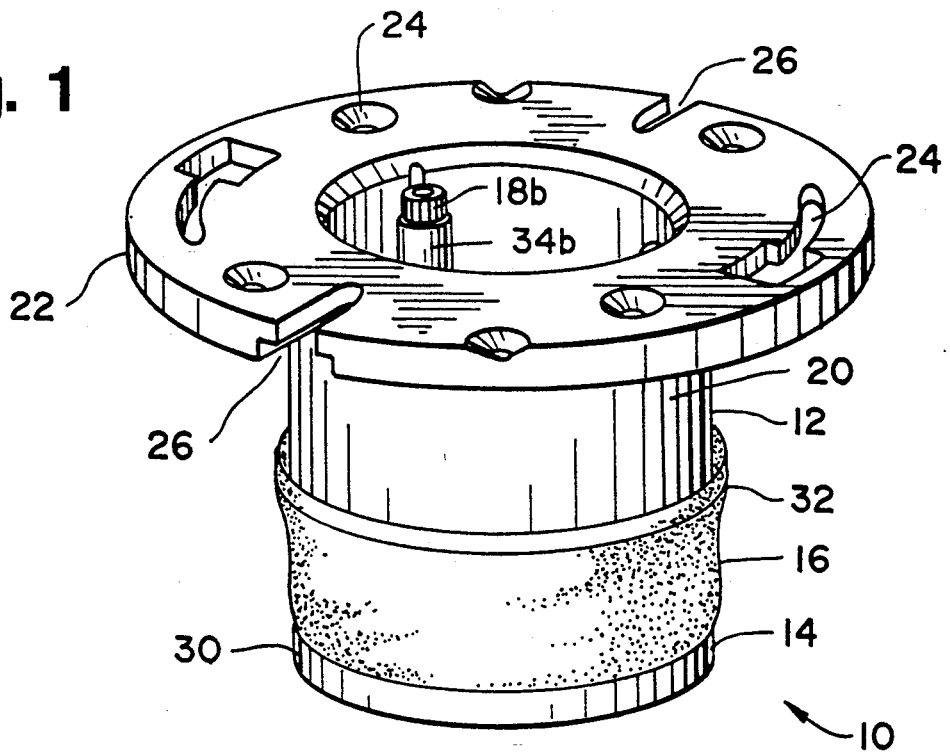
FIG. 1 is a perspective view of the preferred embodiment of the street compression closet flange of the present invention.

Turning to the drawings, there is shown in FIGS. 1 to 7 the preferred embodiment of the street compression closet flange 10 of the present invention. As best shown in FIG. 6, the flange 10 comprises an upper section 12, a lower section 14, a seal 16, and three sets of nuts and bolts 18a, 18b, 18c for tightening the flange 10 after it has been inserted into a pipe.

The upper section 12 of the flange 10 comprises a substantially cylindrical body 20 and a shoulder 22 extending radially outward from one end of the body 20 at a substantially right angle. Displaced around the shoulder 22 are a plurality of openings 24 and slots 26 for receiving bolts or the like which are used to secure the flange 10 to a toilet or other plumbing fixture.

Figure 4:
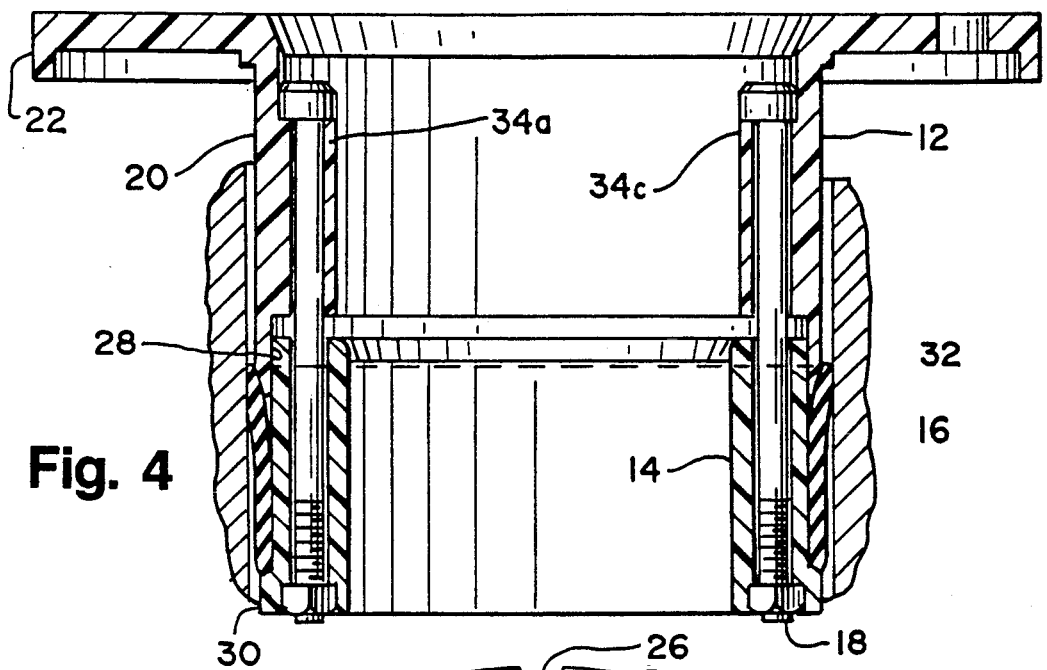
FIG. 4 is a cross-section of the flange taken along line 4—4 of FIG. 2.
Figure 5:
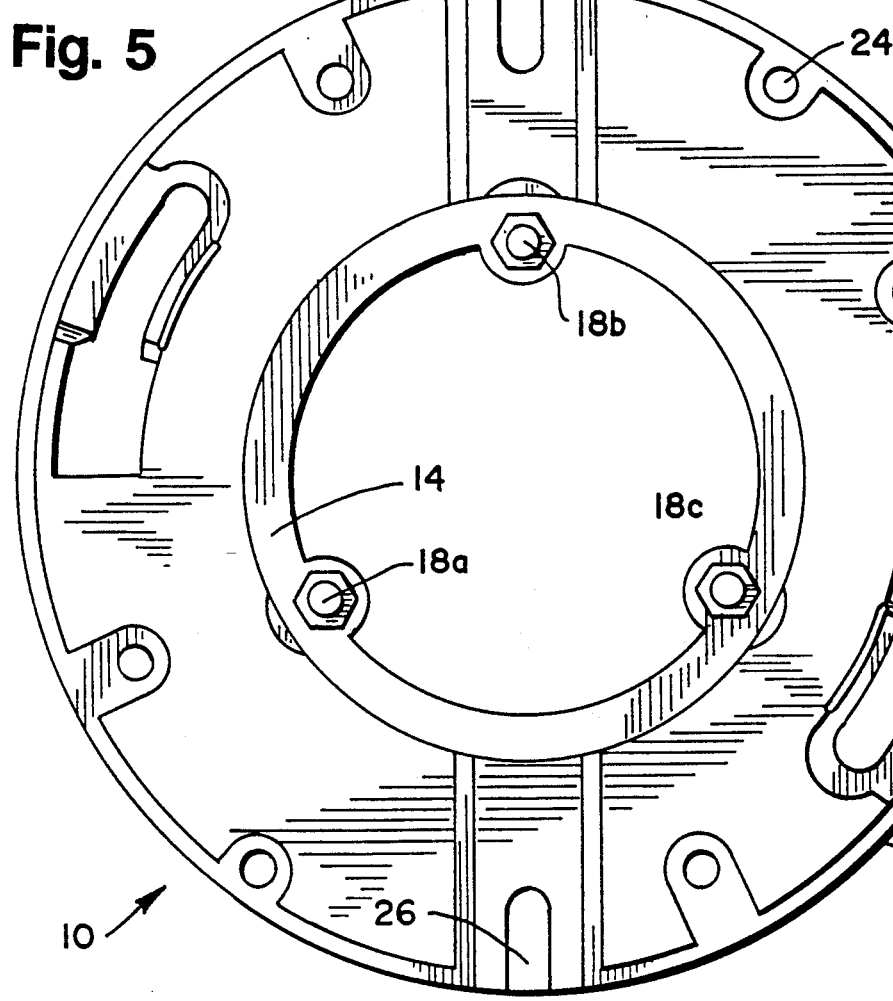
FIG. 5 is a bottom plan view of the flange of FIG. 1.

As best shown in FIG. 4, an end portion 28 of the upper section body 20 opposite the shoulder 22 has an internal diameter of sufficient size for receiving the lower section 14. That is, the internal diameter of the end portion 28 is slightly greater than the outer diameter of the lower section 14 of the flange 10.

The lower section 14 of the flange 10 is a substantially cylindrical body having a lip 30 at one end. In the assembled flange, the lip 30 is located at the end of the lower section 14 opposite the upper section 12 and acts as a stop for the seal 16. The outside diameter of the lip 30 is substantially the same as the outside diameter of the upper section body portion 20.

In the assembled flange, the seal 16 fits around the lower section 14 and a portion of the upper section 12. The seal 16 is substantially cylindrical and has an outside diameter slightly greater than the outside diameter of the upper section body 20 and the lower section lip 30 and an inside diameter slightly smaller than the outside diameter of the upper section body 20. The seal 16 has a slight flair 32 at its upper end to accommodate a portion of the upper section body 20 which fits inside the seal 16. The seal 16 provides a compression fit between the flange 10 and the inside of the pipe. After the flange is installed, the bolts at the top of the flange are tightened which draws the upper section body inside the seal and forces the seal outward, thus forming a compression fit between the seal and the inside of the pipe.

Located on the inside walls of the upper and lower sections and spaced about 120 degrees apart are three channels 34a, 34b, 34c for receiving the three tightening bolts 18a, 18b, 18c. The channels 34a, 34b, 34c, and therefore the bolts 18a, 18b, 18c, are recessed away from the upper section shoulder 22 to provide room for a toilet spigot (not shown) to fit down inside the flange 10.

The upper section 12 and the lower section 14 of the flange 10 may be molded of resilient plastic material such as polyethylene, polypropylene, nylon, or other suitable material. The seal 16 is preferably made from neoprene, although another suitable material may be used.

The flange 10 may be used with cast iron pipe and, unlike conventional cast iron flanges, may also be used with P.V.C. or A.B.S. pipe.

The flange 10 is designed to be used with pipe having an inside diameter of four inches or greater, such as 4" schedule 40 pipe. It is not recommended to use the present invention with pipe having an internal diameter less than four inches. Because the flange fits inside the pipe, it effectively reduces the internal diameter of the conduit to about three inches. Standard plumbing regulations do not allow internal pipe diameters of less than about three inches.

Figure 7:
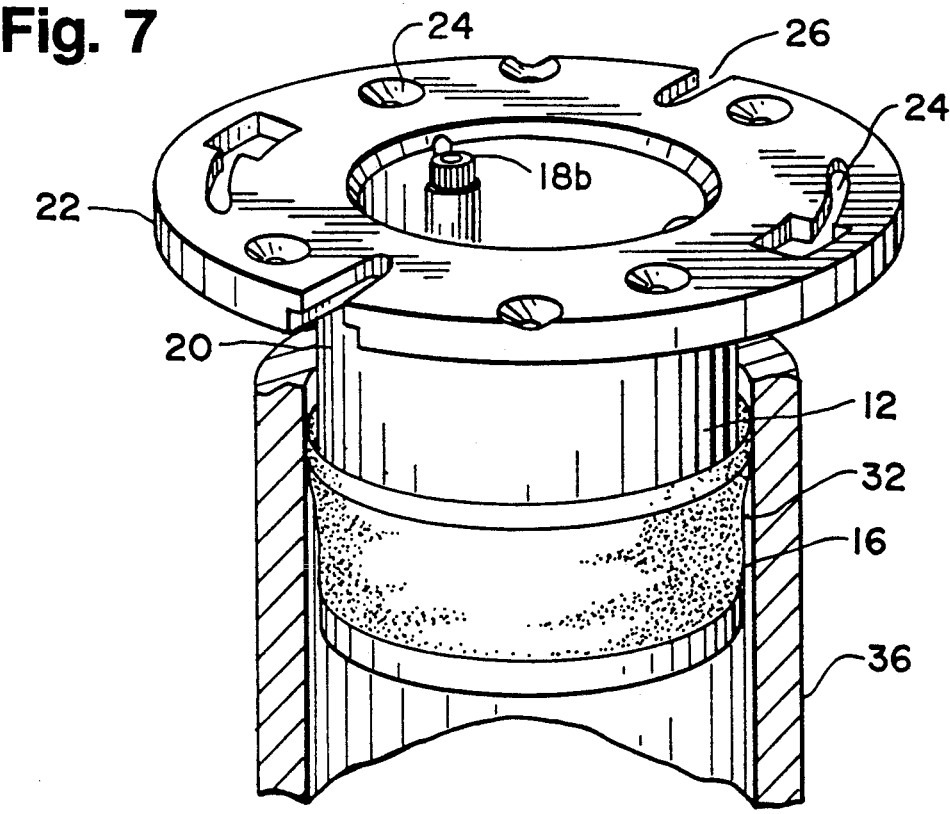
FIG. 7 is a perspective view of the street compression flange of FIG. 1, showing the flange partially installed on top of a cast iron pipe.
Figure 2:
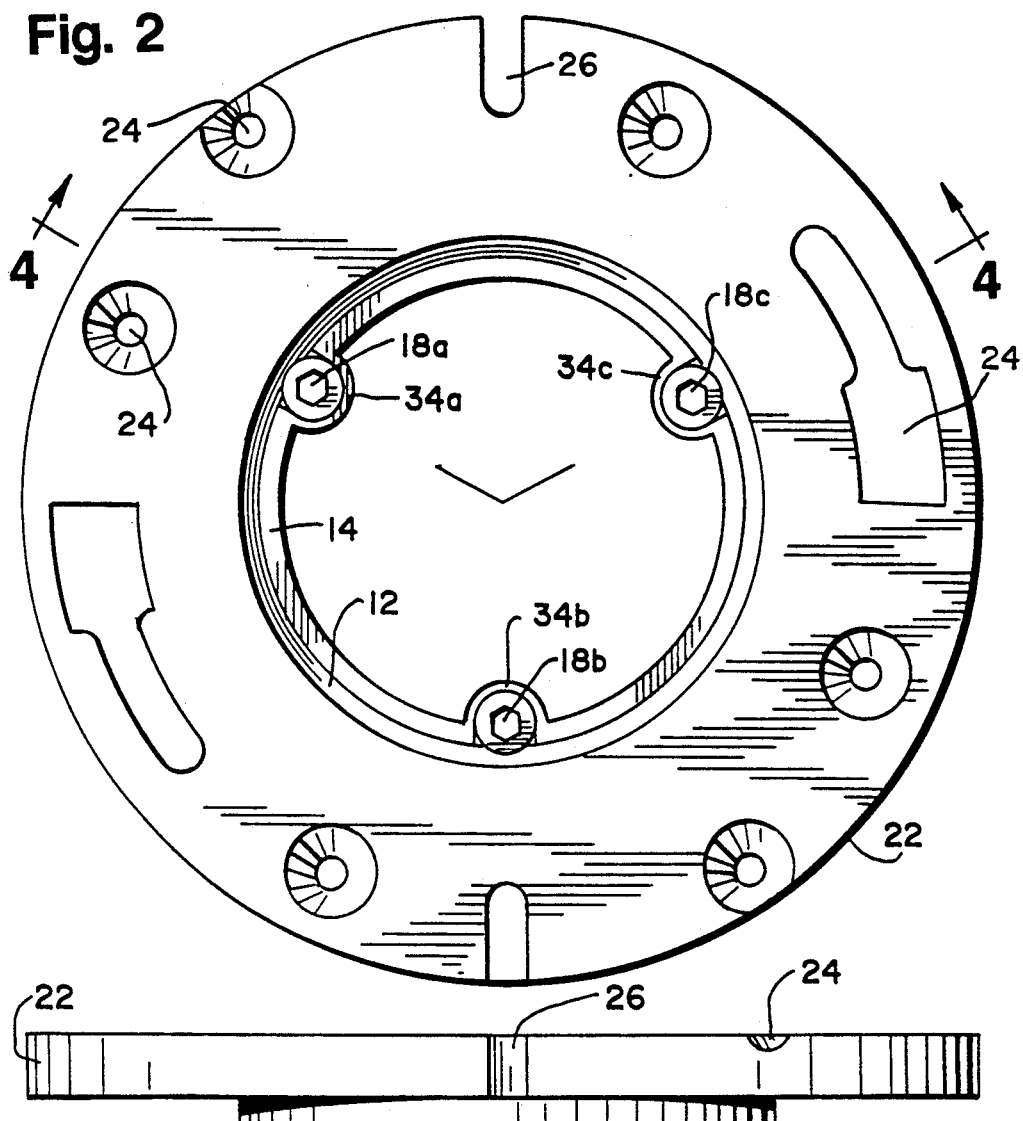
FIG. 2 is a top plan view of the flange of FIG. 1.
Figure 3:
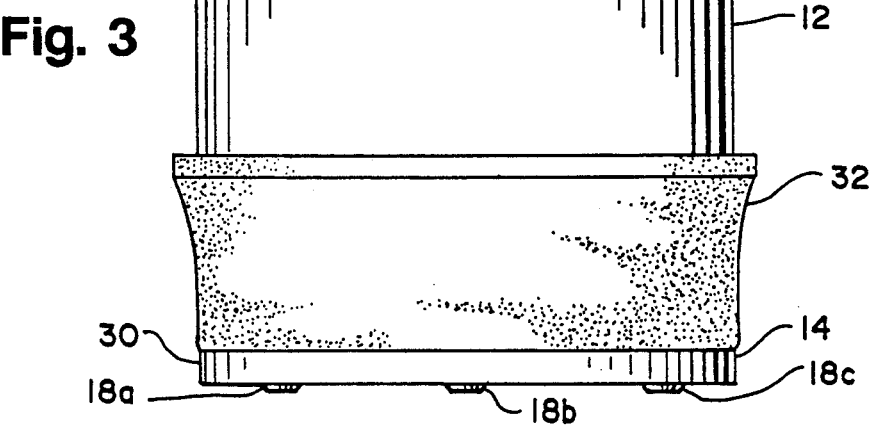
FIG. 3 is a side elevational view of the flange of FIG. 1.

The present invention can be used to replace broken cast iron closet flanges in old buildings where the cost of replacing the flange with a conventional flange, including the cost of cleaning out the old lead joint, is prohibitive. To replace a broken cast iron flange, the present invention is used in the following manner. First, the old cast iron flange is cut off or broken off with a hammer, possibly down into the floor area. Because of the telescoping ability of the present invention, breaking off the flange below floor level is not a problem. Next, the street compression closet flange 10 is inserted by pushing it down inside the pipe 36 (FIG. 7). The height of the flange may be adjusted by sliding the flange 10 up or down inside the pipe 36. Finally, the flange 10 and pipe 36 are sealed by tightening the three bolts 18a, 18b, 18c at the top of the flange 10.

The present invention is also useful in new construction where 4" cast iron, P.V.C. or A.B.S. pipe is used. In new buildings, drains pipes are typically installed first and the concrete floor poured later. When a conventional closet flange is used, it is necessary to chip away the concrete from around the pipe in order to make room for the flange. This method of installing flanges is difficult, time consuming and expensive.

The present invention, by contrast, fits inside the existing pipe, eliminating the need to chip concrete from around the pipe after the concrete floor is poured and dried.

Of course, many modifications and other embodiments of the invention will be recognized by one skilled in the art in view of the foregoing teachings. Therefore, the invention is not to be limited to the exact construction and operation described, and any suitable modifications are to be included within the scope of the claims allowed herein.

I claim as my invention:

1. A street compression closet flange for installation on top of a drain pipe, said flange comprising:

an upper section having a substantially cylindrical body, a shoulder extending radially outward from one end of the body at a substantially right angle thereto, said shoulder having a plurality of openings therein for receiving attachment means, and an end portion opposite the shoulder having a recessed area for receiving a lower section, said lower section fitting inside the end portion of the upper section;

said lower section having a substantially cylindrical body with a lip at one end for seating a substantially cylindrical seal, said lip having an outside diameter substantially the same as the outside diameter of the upper section body;

said upper and lower sections having integrally formed channels located on the inside walls of the upper and lower section bodies for receiving fastening means, said channels being recessed away from the shoulder of the upper section;

said substantially cylindrical seal having an outside diameter slightly greater than the outside diameter of the upper section body and the lower section lip, and having a slight outward flair at one end to accommodate a portion of the upper section body; and fastening means displaced in said channels, wherein tightening said fastening means draws the upper section inside the flair of the cylindrical seal forcing the seal outward, thereby providing a compression fit between the cylindrical seal and the inside of said pipe.

2. The street compression closet flange of claim 1 wherein said fastening means comprises nuts and bolts.

3. The street compression closet flange of claim 1 in which said upper and lower sections are molded of resilient plastic material from the group consisting of polyethylene, polypropylene and nylon.

4. A street compression closet flange for installation on top of a drain pipe, said flange comprising:

an upper section having a substantially cylindrical body, a shoulder extending radially outward from one end of the body at a substantially right angle thereto, said shoulder having a plurality of openings therein for receiving attachment means, and an end portion opposite the shoulder having a recessed area for receiving a lower section, said lower section fitting inside the end portion of the upper section;

said lower section having a substantially cylindrical body with a lip at one end for seating a substantially cylindrical seal; said lip having an outside diameter substantially the same as the outside diameter of the upper section body;

said upper and lower sections having three integrally formed channels located on the inside walls of the upper and lower section bodies and spaced about 120 degrees apart for receiving bolts, said channels being recessed away from the shoulder of the upper section;

said substantially cylindrical seal having an outside diameter slightly greater than the outside diameter of the upper section body and the lower section lip and an inside diameter slightly smaller than the outside diameter of the upper section body, and having a slight outward flair at one end to accommodate a portion of the upper section body; and three sets of nuts and bolts displaced in said channels, wherein tightening said bolts draws the upper section body inside the seal and forces the seal outward, thus forming a compression fit between the seal and the inside of the drain pipe.

5. A method for replacing a broken cast iron closet flange comprising the steps of:

removing the broken cast iron closet flange;

inserting the street compression closet flange according to claim 1 by pushing it down inside the pipe;

sliding the street compression closet flange up or down to achieve the desired height; and forming a compression seal between the flange and the pipe by tightening the fastening means.

* * * * *